(12) United States Patent
Komoto (10) Patent No.: US 9,189,099 B2
(45) Date of Patent: Nov. 17, 2015

(54) INFORMATION INPUT UNIT, INFORMATION INPUT METHOD, AND COMPUTER PROGRAM

(75) Inventor: Takahito Komoto, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/235,762

(22) PCT Filed: Jul. 31, 2012

(86) PCT No.: PCT/JP2012/069427
§ 371 (c)(1),
(2), (4) Date: Jan. 28, 2014

(87) PCT Pub. No.: WO2013/021858
PCT Pub. Date: Feb. 14, 2013

(65) Prior Publication Data
US 2014/0204045 A1    Jul. 24, 2014

(30) Foreign Application Priority Data

Aug. 5, 2011   (JP) ................. 2011-171532

(51) Int. Cl.
*G06F 3/041* (2006.01)
*G06F 3/044* (2006.01)
(Continued)

(52) U.S. Cl.
CPC .............. *G06F 3/0414* (2013.01); *G06F 3/044* (2013.01); *G06F 3/0416* (2013.01); *H04M 1/67* (2013.01); *H04W 52/0254* (2013.01); *H04W 52/0267* (2013.01); *H04M 2250/22* (2013.01)

(58) Field of Classification Search
CPC ..... G06F 3/0414; G06F 3/016; G06F 3/0487; G06F 2203/04105; G06F 3/0416; G06F 3/044; H04M 1/67; H04M 2250/22; H04W 52/0254; H04W 52/0267
See application file for complete search history.

(56) References Cited

U.S. PATENT DOCUMENTS

| 2009/0219175 A1* | 9/2009 | Takashima et al. ............. 341/20 |
| 2010/0149130 A1  | 6/2010 | Jung et al. |
| 2010/0225604 A1* | 9/2010 | Homma et al. ................ 345/173 |

(Continued)

FOREIGN PATENT DOCUMENTS

| CN | 101526873 A | 9/2009 |
| EP | 2113826 A2  | 11/2009 |

(Continued)

OTHER PUBLICATIONS

International Search Report corresponding to International Application No. PCT/JP2012/069427, Oct. 24, 2012, 2 pages.

(Continued)

*Primary Examiner* — Aneeta Yodichkas
(74) *Attorney, Agent, or Firm* — Wilmer Cutler Pickering Hale and Dorr LLP (57) ABSTRACT

A central processing unit (CPU) monitors whether a predetermined event (pressing of a sleep release button, an incoming call, an alarm ring sound, or the like) is generated. When the predetermined event is generated, a sensitivity detection unit sets a sensitivity threshold value for input detection to a threshold value of a high-sensitivity mode, and the CPU displays a screen corresponding to the event. When an input operation is performed on the screen, the sensitivity detection unit resets a subsequent sensitivity threshold value according to input sensitivity information detected when the input operation is performed.

10 Claims, 7 Drawing Sheets

(51) Int. Cl.
*H04W 52/02* (2009.01)
*H04M 1/67* (2006.01)

(56) References Cited

U.S. PATENT DOCUMENTS

| | | | |
|---|---|---|---|
| 2011/0080349 A1* | 4/2011 | Holbein et al. | 345/173 |
| 2011/0084910 A1* | 4/2011 | Almalki et al. | 345/173 |
| 2011/0187675 A1 | 8/2011 | Nakai et al. | |
| 2011/0201911 A1* | 8/2011 | Johnson et al. | 600/365 |

FOREIGN PATENT DOCUMENTS

| | | |
|---|---|---|
| EP | 2330486 A1 | 6/2011 |
| JP | 2007-027034 | 2/2007 |
| JP | 2007-329866 A | 12/2007 |
| JP | 2008-033701 A | 2/2008 |
| JP | 4046095 B2 | 2/2008 |
| JP | 2009-212719 A | 9/2009 |
| JP | 4508248 B2 | 7/2010 |
| KR | 10-2009-0094747 A | 9/2009 |

OTHER PUBLICATIONS

International Search Report issued by the Japan Patent Office for International Application No. PCT/JP2012/069427 mailed Nov. 6, 2012 (3 pages).

Extended European Search Report corresponding to European Application No. 12822524.0, dated Mar. 30, 2015, 9 pages.

* cited by examiner

INFORMATION INPUT UNIT, INFORMATION INPUT METHOD, AND COMPUTER PROGRAM

CROSS-REFERENCE TO RELATED APPLICATIONS

This application is a national stage application of International Application No. PCT/JP2012/069427 entitled "Information Input Unit, Information Input Method, and Computer Program," filed on Jul. 31, 2012, which claims the benefit of the priority of Japanese Patent Application No. 2011-171532, filed on Aug. 5, 2011, the disclosures of each of which are hereby incorporated by reference in their entirety.

TECHNICAL FIELD

The present invention relates to an information input unit, an information input method, and a computer program and, more particularly, to an information input unit, an information input method, and a computer program.

BACKGROUND ART

In recent years, users of information processing devices have increasingly widely used portable terminal devices such as portable telephones and personal digital assistants (PDAs), and various content could thus be acquired and used in these portable terminal devices.

In these portable terminal devices, information input units such as a keyboard, a rotary type operating element (jog dial), and a touch panel which is a contact type information input unit are generally installed as hardware.

In the information input unit using the touch panel or the like, information corresponding to a contact position is transmitted to a central processing unit (CPU) of the portable terminal device to perform a predetermined operation by using one's finger or a dedicated input pen to contact a screen on which a specific image such as an icon is displayed and inputting position information of the contact position.

In the contact type information input unit such as the touch panel, a resistance film type, an electrostatic capacitance type or the like is used.

Between these, the contact type information input unit of the electrostatic capacitance type can be widely adopted as the information input unit because a thickness of a device main body can be thinly formed and a degree of freedom of a shape of the panel itself is also high.

As well-known technology in this art, for example, in Patent Document 1, technology for generating a plurality of types of vibrations, each of which has a vibration time differing according to each operator corresponding to a sliding speed or a sliding operation time of one's finger or the like of the operator, is disclosed. Specifically, there are provided an input detection means which has an input detection surface and detects a contact position of the finger of the operator and a sliding speed of the finger of the operator, a CPU which calculates a vibration pattern based on the sliding speed detected by the input detection means, and a vibration means which vibrates the input detection surface based on the vibration pattern calculated by the CPU. According to a distance from a position at which the finger of the operator is in contact with the input detection surface, the CPU calculates the vibration pattern to generate vibrations from low-frequency and small-amplitude vibration to high-frequency and large-amplitude vibration. According to this configuration, it is possible to generate a plurality of types of vibrations, each of which has a vibration pattern differing according to each operator corresponding to a sliding speed or a sliding operation time of an operator's finger.

In Patent Document 1, a digital camera having an electrostatic capacitance type touch panel for a sliding input on an upper surface plate of a camera main body is disclosed.

The user can perform an operation such as zoom-in, zoom-out, reproduction/fast forward/rewind, focus adjustment, or volume adjustment by causing an operation body such as one's finger to slide in a predetermined direction in a state in which the operation body such as the finger is in contact with an electrostatic capacitance type input sheet.

Here, the principle of the above-described electrostatic capacitance type information input device will be described.

Figure 5:
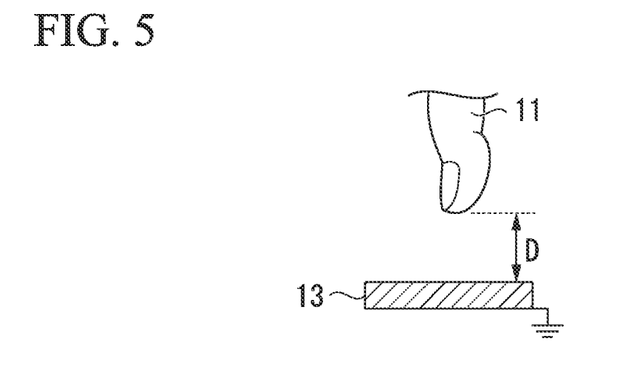
FIG. 5 is an explanatory diagram illustrating the principle of an electrostatic capacitance type sensor.

FIG. 5 is an explanatory diagram illustrating the principle of an electrostatic capacitance type sensor.

Figure 6A:
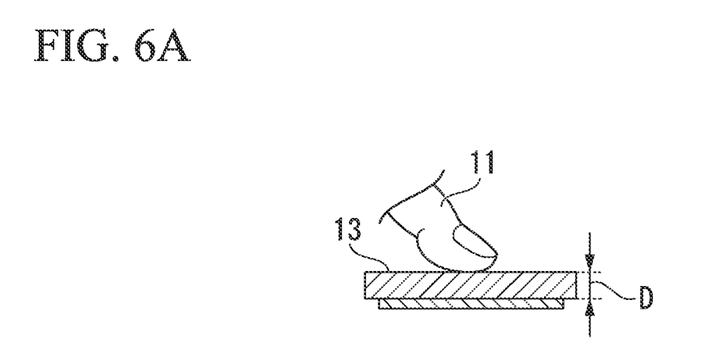
FIG. 6A is an explanatory diagram illustrating the principle of the electrostatic capacitance type sensor (the case of a bare hand).
Figure 6B:
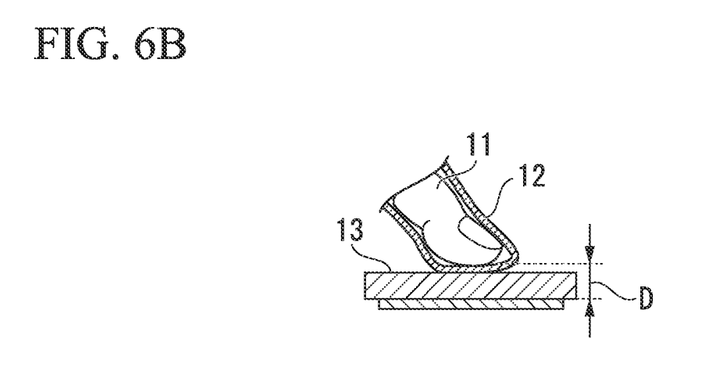
FIG. 6B is an explanatory diagram illustrating the principle of the electrostatic capacitance type sensor (a gloved state).

As illustrated in FIG. 5, if one's finger 11 is in proximity (contact) with the touch panel 13 as illustrated in FIG. 6A or 6B when the user operates the touch panel 13, electrostatic capacitance is generated between the touch panel 13 and the user's finger 11. This is because a human body has conductivity.

The electrostatic capacitance generated between the touch panel 13 and the user's finger 11 has displacement in inverse proportion to a distance between the touch panel and the user's finger as illustrated in Equation (1).

In Equation (1), C is a reference sign denoting electrostatic capacitance, c is a reference sign denoting a dielectric constant of each material, S is a reference sign denoting an area of the finger 11, and D is a reference sign denoting a distance between the finger 11 and the touch panel 13.

$$C = (\in \cdot S)/D \quad (1)$$

An input device performs a predetermined process input according to the user's touch operation by detecting position information based on electrostatic capacitance generated when the user brings the finger 11 in contact with the touch panel 13.

Figure 7A:
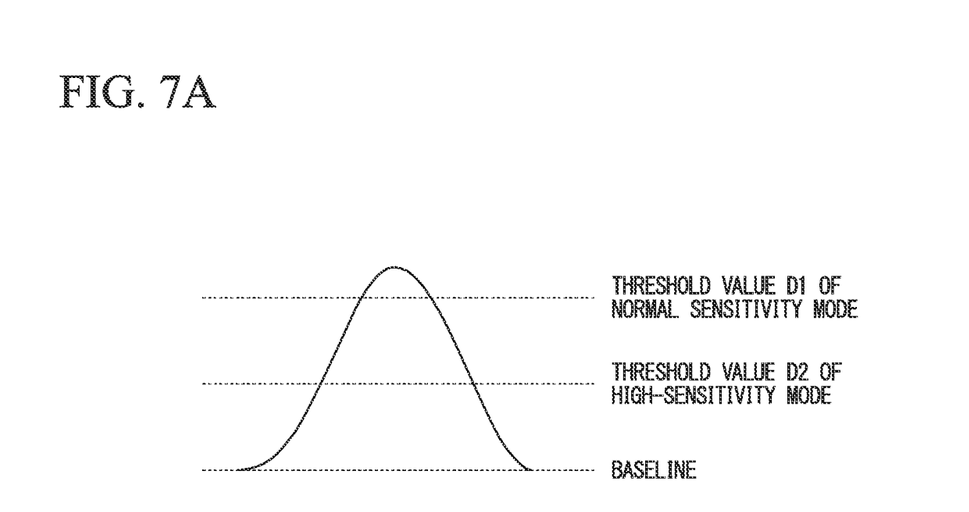
FIG. 7A is a diagram illustrating input sensitivity information (a variation amount in electrostatic capacitance) with the bare hand as illustrated in FIG. 6A.
Figure 7B:
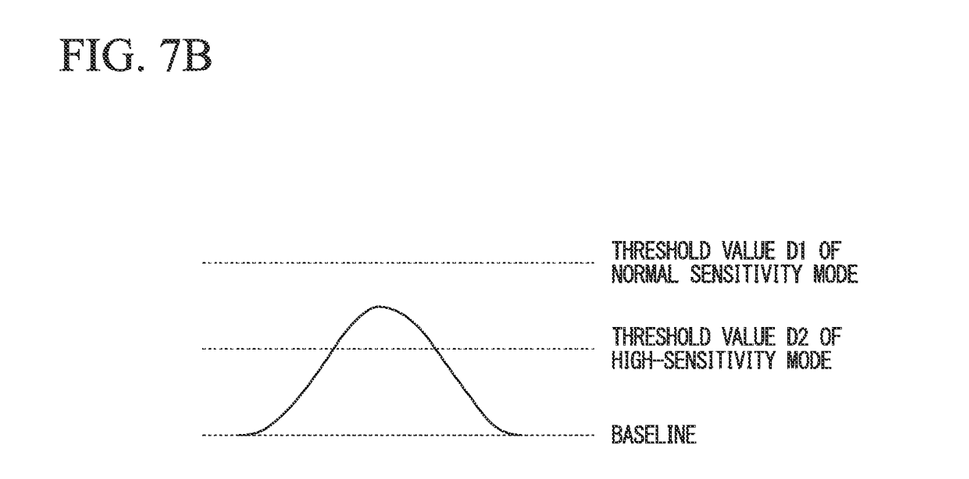
FIG. 7B is a diagram illustrating input sensitivity information (a variation amount in electrostatic capacitance) in the gloved state as illustrated in FIG. 6B.

FIGS. 7A and 7B are diagrams illustrating input sensitivity information (variation amounts in electrostatic capacitance) in a bare hand state and a gloved state as illustrated in FIGS. 6A and 6B.

In a threshold value of a normal sensitivity mode illustrated in FIG. 7A, as in the case of the bare hand illustrated in FIG. 6A, no touch detection is performed when the input sensitivity information does not exceed a normal sensitivity threshold value. In addition, in the high-sensitivity mode, because the touch detection is performed when the input sensitivity information exceeds the threshold value of the high-sensitivity mode, the touch detection is performed even with the bare hand illustrated in FIG. 6A and even in the case of the glove illustrated in FIG. 6B.

In addition, for example, in Patent Document 2, technology for adjusting the sensitivity of the input detection unit according to an operation environment of the user is disclosed. Specifically, the CPU determines whether to adjust an output level of a position signal output from an input detection unit based on sensitivity information (sensitivity data) detected by the sensitivity detection unit. When it is determined that a value of the sensitivity data is less than the threshold value (gloved), the input detection unit is set to high sensitivity based on adjustment data supplied from the CPU. On the other hand, when it is determined that the value of the sensitivity data is less than the threshold value (ungloved), the input detection unit is maintained at standard sensitivity based on the adjustment data supplied from the CPU or the input detection unit is changed from a high-sensitivity setting to standard (low) sensitivity. Thereby, because it is possible to optimally set the sensitivity of the input detection unit according to an operation environment such as when the user wears a glove or when the user does not wear a glove, information can be accurately input and an erroneous operation can be prevented.

Further, for example, in Patent Document 3, a threshold value correction device provided to automatically correct a threshold value of an in-vehicle device is disclosed. Specifically, a driver's finger touches a push start switch for starting and stopping an engine and therefore the presence/absence of detection of an electrostatic capacitance sensor within the push start switch is determined, electrostatic capacitance of the electrostatic capacitance sensor is calculated by a microcomputer, and the threshold value is corrected based on the electrostatic capacitance. Further, the microcomputer sets the corrected threshold value in an in-vehicle device such as an air conditioner or an audio device having the electrostatic capacitance sensor.

DOCUMENTS OF THE PRIOR ART

Patent Documents

[Patent Document 1]
    Japanese Patent No. 4046095
[Patent Document 2]
    Japanese Patent No. 4508248
[Patent Document 3]
    Japanese Unexamined Patent Application, First Publication No. 2007-329866

DISCLOSURE OF INVENTION

Problems to be Solved by the Invention

However, in the information input unit described in the above-described background art, for example, the input device disclosed in Patent Document 1 has problems disclosed in the following items (1) and (2).

(1) Because the electrostatic capacitance is varied in inverse proportion to a distance between the operation body such as the finger and the input detection sensor in the electrostatic capacitance type information input unit as described above, a distance between the finger 11 and the touch panel 13 is formed by a thickness of an insulation member constituting the glove 12 when a portable information terminal device is operated in a state in which the user wears the glove 12 as illustrated in FIG. 6B, and therefore the electrostatic capacitance detected when the user wears a glove is small compared to when the information input unit is operated by a bare hand (see FIGS. 7A and 7B).

As a result, there is a problem in that it is difficult to detect an input operation in spite of a process in which the user performs the operation for an input.

(2) In order to solve the problem described above in (1), the sensitivity of the input detection sensor may be preset to a high level (for example, the threshold value of the high-sensitivity mode illustrated in FIG. 7B is used).

However, when the user has operated the input device with his or her bare hand in a state in which the detection sensitivity of the input detection sensor has been set to the high level in this manner, there is a problem of occurrence of an erroneous operation (malfunction) such as that input information is detected even when there is no contact with the input detection sensor or that an unintended position is detected as an input position because the sensitivity at which detection is performed is too high.

In addition, as a result, there is a problem in that the original operability of a touch operation is significantly degraded.

In relation to the above-described problems, in the above-described Patent Documents 2 and 3, it is possible to determine the state of the operation body such as the finger based on electrostatic capacitance generated when there is contact and adjust the sensitivity of the input detection unit according to an operation situation.

For example, in the above-described Patent Document 3, the sensitivity adjustment is performed based on the electrostatic capacitance of the operation body such as the finger when there is contact with a starter or a door knob of a vehicle and the sensitivity adjustment is reflected in the input sensitivity when another device is operated.

Although the sensitivity adjustment is performed only at the moment of contact with the door knob and when the engine starts up (that is, at the time of boarding a vehicle) in Patent Document 3, a state (gloved/ungloved or the like) of the operation body such as the finger may be varied in consideration of the case of long-distance movement or the case of staying in a vehicle while the engine operates for a long time.

That is, it is difficult to cope with situation variation when an interval of the sensitivity adjustment is long at the timing of the sensitivity adjustment as illustrated in the above-described Patent Document 3 and ultimately the above-described problems (1) and (2) are yet unsolved.

In relation to the technology disclosed in this Patent Document 3, in the above-described Patent Document 2, the sensitivity adjustment is "constantly" performed according to the sensitivity detection by the input detection unit and variation in the electrostatic capacitance. Thus, there is a problem in that the load on the CPU also increases and power consumption also increases.

Incidentally, in portable type information processing terminal devices of recent years, it is possible to suppress power consumption by hiding a screen display and transitioning to a sleep state when there is no operation for a fixed time.

In addition, in order to prevent an erroneous operation while the portable type information processing terminal device is put in a pocket or a bag during the sleep state, input detection of the information input unit such as a touch panel is configured to be turned OFF.

Further, in order to release the sleep state, a configuration is made so that it is necessary to press a sleep release button.

The present invention has been made in view of the above-described problems of the related art, and an object of the invention is to provide an information input unit, an information input method, and a computer program by which features of a portable type information processing terminal device are utilized, sensitivity detection is performed in an optimum setting, and sensitivity adjustment of an input detection unit can be performed according to an operation environment of a user.

Means for Solving the Problem

According to the present invention for achieving the aforementioned object, there is provided an information input unit including: a sensitivity detection means including an input detection sensor configured to detect contact or proximity of an operation body; a sensitivity threshold value setting means configured to set a sensitivity threshold value for determining a magnitude of input sensitivity information detected by the sensitivity detection means according to a sensitivity mode; an input determination means configured to compare input sensitivity information detected by the sensitivity detection means to the set sensitivity threshold value and determine that an input operation has been performed when the input sensitivity information exceeds the sensitivity threshold value; means configured to set the sensitivity threshold value to a threshold value corresponding to a high sensitivity mode via the sensitivity threshold value setting means when one of predetermined events which lead to release of a sleep state is generated; a display means configured to display a predetermined display screen corresponding to the predetermined event after the threshold value has been set; and means configured to change the sensitivity mode according to the input sensitivity information at an operation time and reset the sensitivity threshold value via the sensitivity threshold value setting means when the input operation has been performed in the high-sensitivity mode for the predetermined display screen displayed in correspondence with generation of the one predetermined event.

In addition, according to the present invention, there is provided an information input method including: a sensitivity detection step of using information from an input detection sensor which detects contact or proximity of an operation body; a sensitivity threshold value setting step of setting a sensitivity threshold value for determining a magnitude of input sensitivity information detected in the sensitivity detection step according to a sensitivity mode; an input determination step of comparing the input sensitivity information detected in the sensitivity detection step to the set sensitivity threshold value and determining that an input operation has been performed when the input sensitivity information exceeds the sensitivity threshold value; a step of setting the sensitivity threshold value to the threshold value corresponding to the high-sensitivity mode via the sensitivity threshold value setting step when one of predetermined events which leads to release of a sleep state is generated; a display step of displaying a predetermined display screen corresponding to the event after the setting; and a step of changing the sensitivity mode according to the input sensitivity information at an operation time and resetting the sensitivity threshold value via the sensitivity threshold value setting step when the input operation has been performed in the high-sensitivity mode for the predetermined display screen displayed in correspondence with generation of the one predetermined event.

Further, according to the present invention, there is provided a computer program which controls: a sensitivity detection step of using information from an input detection sensor which detects contact or proximity of an operation body; a sensitivity threshold value setting step of setting a sensitivity threshold value for determining a magnitude of input sensitivity information detected in the sensitivity detection step according to a sensitivity mode; an input determination step of comparing the input sensitivity information detected in the sensitivity detection step to the set sensitivity threshold value and determining that an input operation has been performed when the input sensitivity information exceeds the sensitivity threshold value; a step of setting the sensitivity threshold value to the threshold value corresponding to the high-sensitivity mode via the sensitivity threshold value setting step when one of predetermined events which leads to release of a sleep state is generated; a display step of displaying a predetermined display screen corresponding to the event after the setting; and a step of changing the sensitivity mode according to the input sensitivity information at an operation time and resetting the sensitivity threshold value via the sensitivity threshold value setting step when the input operation has been performed in the high-sensitivity mode for the predetermined display screen displayed in correspondence with generation of the one predetermined event.

Effect of the Invention

According to the information input unit of the present invention as described above, there is an advantageous effect in that it is possible to reduce a load on a CPU and reduce power consumption and appropriately cope with state variation in an operation body such as a user's finger.

DESCRIPTION OF EMBODIMENTS

An information input unit in an embodiment of the present invention is an information input unit having a function of performing adjustment to optimum sense sensitivity suitable for a state of an operation body such as a user's finger, and is characterized by a configuration in which the state of the operation body is determined using only sense sensitivity information obtained upon detecting a touch on a predetermined operation screen displayed when a sleep state has been released and the sensitivity adjustment is performed.

In this embodiment, an unlock screen, an incoming call screen, and an alarm ring sound screen are used as the predetermined operation screen.

According to the above-described configuration, because a situation of a state determination of the operation body and a situation of adjustment of sense sensitivity are assumed to be limited, it is possible to reduce a load on a CPU or a power consumption amount of a battery rather than to perform the constant state determination/sensitivity adjustment.

Figure 8:
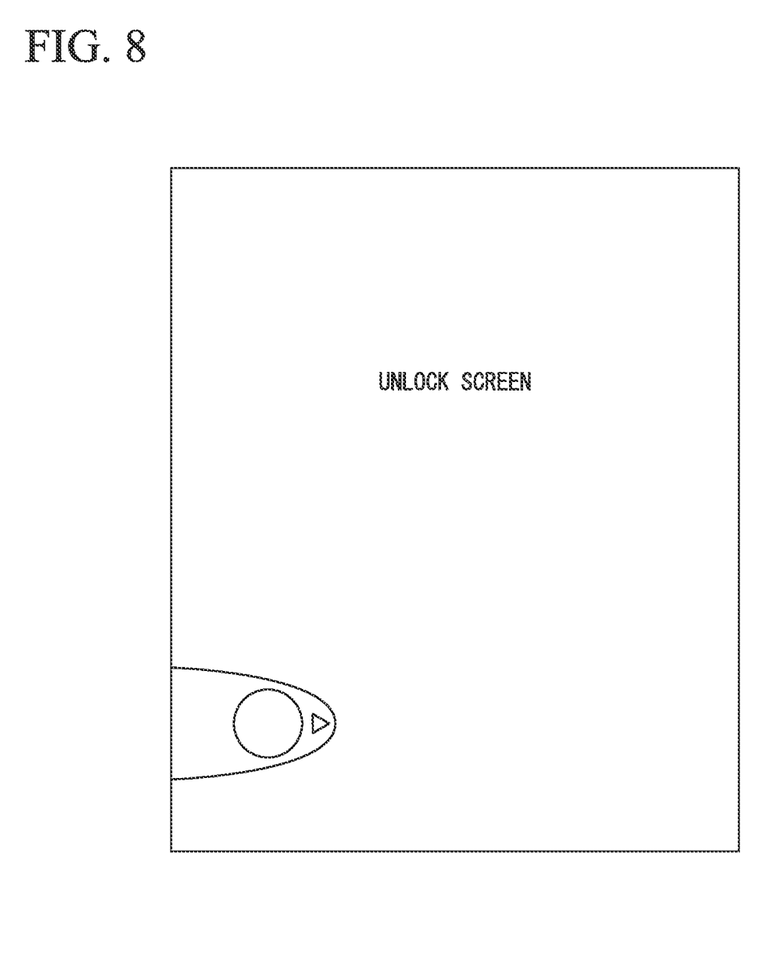
FIG. 8 is an explanatory diagram illustrating an example of an unlock screen.

Because a sleep release button is generally also pressed while the user puts the portable type information processing terminal device in a pocket or a bag and consequently an erroneous operation is likely to occur in the well-known portable type information processing terminal device, a mechanism in which the unlock screen as illustrated in FIG. 8 is displayed even when the sleep release button is released and the user is caused to perform an unlock process based on a specific operation (for example, slide of a finger tip display part or an input of a personal identification number) is embedded as a standard device.

That is, the portable type information processing terminal device provided with a contact type information input unit is characterized in that a first screen at the time of sleep release is necessarily the unlock screen.

Here, in the case of a usage example in which mail is viewed using the well-known portable type information processing terminal device, an operation procedure of the following steps (1) to (5) is necessary.

First, the sleep state is released by pressing the sleep release button in step (2) from the sleep state of step (1), unlocking is performed by performing a specific operation in the unlock screen (see FIG. 8) in step (3), and the mail is read using mail application software in step (4). In step (5), the state transitions to the sleep state again when there is no operation for a fixed time after the reading ends or by pressing the sleep button.

In this series of operation procedures, although it is difficult to consider a change of a state (gloved or ungloved) of an operation body such as one's finger, a configuration in which sensitivity can be maintained until the next sleep state is reached according to a sensitivity value detected when the unlock screen has been displayed even without performing constant sense sensitivity detection or the like as shown in the above-described Patent Document 2 contributes to load reduction for the CPU and reduction of power consumption. In addition, if a high-sensitivity mode is used only when it is determined that the user has worn a glove in the unlock screen of step (3), the above-described problem (2) can be solved and a more desired operation may be performed.

Hereinafter, embodiments of an information input unit, an information input method, and a computer program according to a first embodiment of the present invention will be described in detail with reference to the drawings.

Because the computer program according to the present invention is a program to be implemented as each component included in the information input unit in the description of each embodiment, program-related description is included in the following description.

Figure 1:
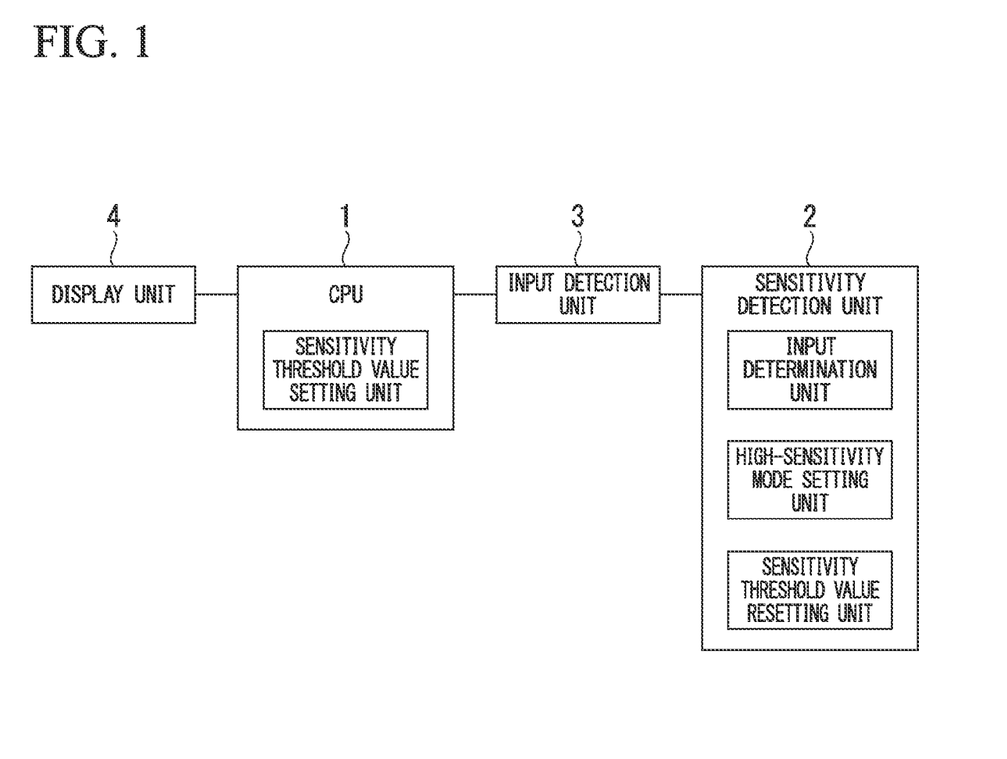
FIG. 1 is a configuration diagram illustrating an overall configuration of an information input unit according to an embodiment of the present invention.

FIG. 1 is a configuration diagram illustrating an overall configuration of the information input unit according to the embodiment of the present invention.

The information input unit according to the embodiment of the present invention illustrated in FIG. 1 includes a CPU 1, a sensitivity detection unit 2 having a contact type input detection sensor, an input detection unit 3 which detects a contact position of the operation body of the user, and a display unit 4.

Components not included among the components of the present invention include other devices, a power supply unit, etc.

In addition, the CPU 1 can also be used as a CPU provided in a portable type information processing device to which the information input unit according to the first embodiment is applied.

The information input unit according to the embodiment of the present invention is not specifically limited to a portable telephone and a smartphone, and may be applied to other devices (for example, a game machine, a tablet personal computer (PC), a notebook PC, etc.).

Hereinafter, an outline of a function of the information input unit according to the first embodiment will be described. Although the predetermined display screen to be displayed when the sleep state is released as the timing at which a threshold value of the sensitivity detection in the following description is set serves as an unlock screen, it is only necessary for the predetermined display screen serving as the timing at which the threshold value of the sensitivity detection is set to be a screen on which an input operation is performed generally in the present invention. In addition, an incoming call screen, an alarm ring sound screen, etc. are also possible (an operation in the incoming call screen and an operation in the alarm ring sound screen will be described later).

When the predetermined screen (here, the unlock screen) rises to be displayed by sleep release, the CPU 1 controls a sensitivity detection unit 2 and an input detection unit 3 to start sensitivity detection and input detection. In addition, the CPU 1 receives position information determined by the input detection unit 3 based on input sensitivity information detected by the sensitivity detection unit 2 and consequently output from the input detection unit 3.

The CPU 1 has a sensitivity threshold value setting unit which sets a sensitivity threshold value.

For example, when the CPU 1 determines that a value of the input sensitivity information is less than a threshold value D1 of a normal sensitivity mode and greater than or equal to a sensitivity threshold value D2 (gloved) of the high-sensitivity mode, a high-sensitivity mode setting unit included in the sensitivity detection unit 2 sets the mode to the high-sensitivity mode.

In addition, the CPU 1 controls all the other components and sets the mode to a standard sensitivity mode (normal sensitivity mode) to change the threshold value of the detection sensitivity (resetting of the sensitivity threshold value) using a sensitivity threshold value resetting unit included in the sensitivity detection unit 2 upon determining that the value of the input sensitivity information is greater than or equal to the threshold value D1 of the normal sensitivity mode (ungloved).

Also, the normal sensitivity mode and the high-sensitivity mode set in the above description are maintained when there is no operation for a fixed time or until the sleep state is reached by pressing the sleep button.

Because the sensitivity of the input detection unit 3 is set at an optimum timing according to an operation environment such as when the user wears the glove or when the user does not wear the glove and the sensitivity mode can be maintained for a necessary time according to the configuration in this manner, it is possible to accurately input information and prevent an erroneous operation while reducing a load on the CPU or a power consumption amount of a battery.

Hereinafter, the function of the information input unit according to the first embodiment will be described in further detail for each component.

The CPU 1 performs the above-described process. In this process, control of a display of a display screen of the sleep state, the unlock state, or the like to be performed by the display unit 4 is also included.

The display unit 4 is a display means and displays the display screen. That is, screen information and the like output from the CPU 1 are displayed.

The sensitivity detection unit 2 has an electrostatic capacitance type sensitivity detection sensor, detects sensitivity information obtained by a touch operation of the operation body such as one's finger for an input detection sensor or proximity of the operation body, and outputs an input to the input detection unit 3 when the detected sensitivity information exceeds a threshold value of the set sensitivity mode.

The input detection unit 3 includes an input detection means which outputs an input signal to the CPU 1 only when the input signal has been received from the sensitivity detection unit 2 using position information obtained by the touch operation of the operation body for the input detection sensor having the electrostatic capacitance type sensitivity detection sensor or the proximity of the operation body as input information.

The sensitivity detection unit 2 includes an input determination means which makes an input determination, that is, compares the input sensitivity information detected by performing input sensitivity detection to the sensitivity threshold value of the set sensitivity mode, and provides an output (notification) indicating that the input operation has been performed when the input sensitivity information exceeds the sensitivity threshold value to the input detection unit 3 and a sensitivity adjustment means which adjusts the sensitivity threshold value of the input detection sensor according to a determination in the CPU 1.

Here, the sensitivity information is a variation amount in the electrostatic capacitance between the operation body and the sensitivity detection unit (input detection sensor).

Thus, in the above-described sensitivity adjustment means, for example, when it is determined that the sensitivity information is small (gloved) in the sensitivity detection unit 2, an input detection threshold value is adjusted so that a small variation amount can be detected even when the variation amount in the electrostatic capacitance is small. Thereby, it is possible to detect the input touch or the proximity of the operation body even when the user wears a glove or the like.

On the other hand, when it is determined that the sensitivity information from the sensitivity detection unit 2 is sufficiently large (ungloved or the like), the above-described sensitivity adjustment means adjusts the sensitivity threshold value so that the input touch or the proximity of the operation body can be detected even when the variation amount in the electrostatic capacitance is large. Thereby, because the sensitivity of the input detection unit 2 can be decreased, it is possible to detect the touch operation or the proximity of the operation body with higher accuracy.

In addition, the sensitivity detection unit 2 has a sensitivity detection screen setting means which sets a screen for performing sensitivity detection, a sensitivity detection means which performs the sensitivity detection in the sensitivity detection screen set by the sensitivity detection screen setting means, and a sensitivity mode control means which maintains the set sensitivity mode until the sleep state is reached.

Thereby, because an optimum screen for setting the sensitivity and its setting period can be registered in advance and controlled, it is possible to change and optimize touch sensitivity according to an operation environment such as when the user wears a glove or when the user does not wear a glove without performing sensitivity detection or sensitivity control at any time.

In addition, because the sensitivity detection screen set by the above-described sensitivity detection screen setting means is displayed at the timing at which an operation of the portable information terminal device is started for sensitivity adjustment, it is desirable to set a screen to be displayed upon returning from the sleep state.

Although the case in which a setting process is performed in an "unlock screen" displayed after the sleep state is released in the portable information terminal device has been described in the first embodiment, for example, the "incoming call screen" to be displayed when there is an incoming call, an "alarm ring sound screen" to ring (to be displayed) at a date and time at which a schedule or the like is set, are generally possible as the predetermined display screen to be displayed when the sleep state is released for providing the timing at which the threshold value of the input sensitivity is set in the information input unit according to the present invention. In addition, it is also possible to automatically set a screen to be displayed upon returning from the sleep state as the sensitivity detection screen.

Also, in the first embodiment, it is assumed that a predetermined event defined in advance is an unlock time, an incoming call time, and an alarm ring sound time and the sleep state is released when any one of the events is generated.

Figure 2:
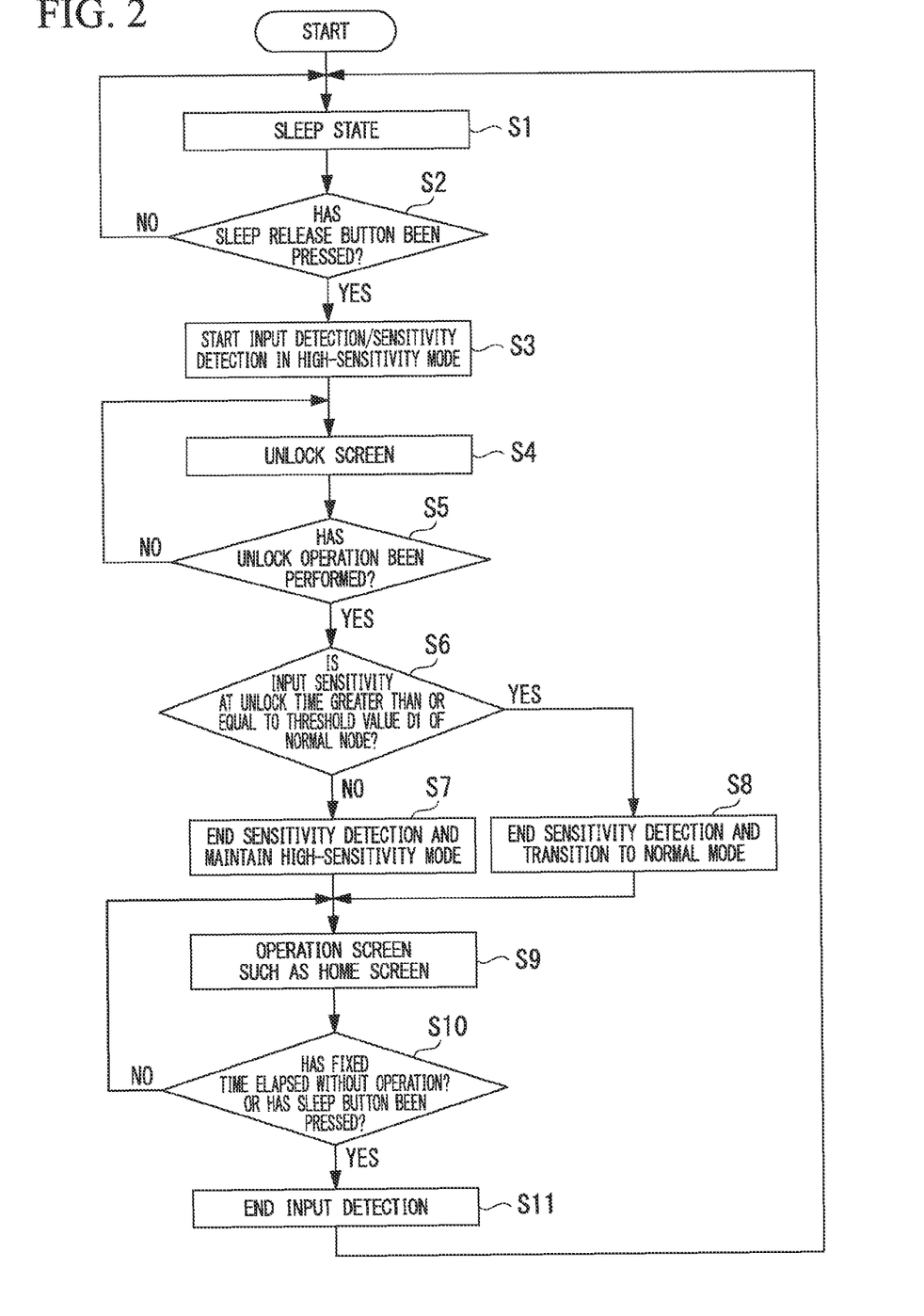
FIG. 2 is a flowchart diagram illustrating an operation when sensitivity detection screen setting of the information input unit according to the embodiment of the present invention is performed via an "unlock screen."

FIG. 2 is a flowchart diagram illustrating an operation when sensitivity detection screen setting of the information input unit according to the first embodiment of the present invention is performed via an "unlock screen."

Hereinafter, an operation when the sensitivity detection screen setting of the information input unit according to this embodiment is performed via the "unlock screen" will be described using the flowchart illustrated in FIG. 2 with reference to FIG. 1.

Here, it is assumed that the sensitivity threshold value is set as a threshold value D1 (FIG. 7A) in the standard sensitivity mode (normal sensitivity mode) when the user performs an operation with his or her bare hand and the sensitivity threshold value is set as a threshold value D2 (FIG. 7B) in the high-sensitivity mode when the user performs an operation while wearing a glove.

(Step S1)

First, in step S1, this information input unit is put in the sleep state under control of the CPU 1 when a state in which there is no operation continues for a fixed time or when the sleep button is pressed.

(Step S2)

Next, in step S2, the CPU 1 waits in the sleep state until the sleep release button is pressed. When the sleep release button is pressed, the process proceeds to step S3.

(Step S3)

In step S3, the CPU 1 receives a sleep release signal when the sleep release button has been pressed and controls the input detection unit 3 and the sensitivity detection unit 2 to start an operation under the high-sensitivity mode (the sensitivity threshold value is set as the threshold value D2 as illustrated in FIG. 7B).

(Step S4)

Next, in step S4, the CPU 1 controls the display unit 4 to display the unlock screen (for example, a screen illustrated in FIG. 8).

(Step S5)

Next, in step S5, the CPU 1 waits in a state of the unlock screen until the unlock operation is performed in the above-described unlock screen. When the unlock operation is performed, the process proceeds to step S6.

At this time, in the display unit 4, the unlock screen as illustrated in FIG. 8 is displayed, and it is necessary to perform a drag operation according to a direction (here, right) indicated by an arrow with the touch of a finger tip display portion so as to perform unlocking via the screen.

Hereinafter, details of this operation will be described. First, the sensitivity detection unit 2 verifies whether there is a touch input by comparing input sensitivity information and the sensitivity threshold value D2 of the high-sensitivity mode, and outputs a signal indicating that an input has been performed (there has been an input) to the input detection unit 3 when the input sensitivity information exceeds the sensitivity threshold value.

Upon receiving the signal from the sensitivity detection unit 2, the input detection unit 3 detects input position information and a touch position and method on a lock screen are output as input information to the CPU 1.

Thereby, if the unlock operation is input, unlocking is achieved.

(Step S6)

In step S6, the sensitivity detection unit 2 determines the state of the operation body such as one's finger from the input sensitivity information detected at the unlock operation time of step S5 using the sensitivity determination means. More specifically, it is verified whether the input sensitivity at the unlock operation time is greater than or equal to the sensitivity threshold value D1 of the normal mode. When the input sensitivity is greater than or equal to the sensitivity threshold value D1 of the normal mode, the process proceeds to step S8. When the input sensitivity is not greater than or equal to the sensitivity threshold value D1, the process proceeds to step S7.

(Step S7)

In step S7, the sensitivity detection unit 2 maintains the high-sensitivity mode set in step S3 when the detected input sensitivity information is less than the sensitivity threshold value of the normal mode and greater than or equal to the sensitivity threshold value of the high-sensitivity mode (that is, when it is determined that the touch is input by a gloved finger) (accordingly, the threshold value D2 of the high-sensitivity mode continues for the sensitivity threshold value). The process proceeds to step S9 after the sensitivity detection has ended.

(Step S8)

In step S8, the sensitivity detection unit 2 sets the mode to the normal mode when the detected input sensitivity information is greater than or equal to the threshold value D1 of the sensitivity threshold value of the normal mode (that is, when it is determined that a touch has been input by a bare finger) in the determination result of the sensitivity determination means (accordingly, the sensitivity threshold value is also set to the threshold value D1 of the normal sensitivity mode). The process proceeds to step S9 after the sensitivity detection has ended.

(Step S9)

In step S9, the CPU 1 proceeds to an operation screen such as a standby/home screen when the unlock operation is performed (the operation screen is displayed and various terminal operations are possible). Thereafter, the process proceeds to step S10.

For a subsequent sensitivity threshold value, the threshold value of the sensitivity mode set in step S7 or S8 is maintained.

(Step S10)

In step S10, the CPU 1 waits in a state of the above-described operation screen until the fixed time has elapsed in the non-operation state in the above-described operation screen or the sleep button is pressed. The process proceeds to step S11 when the fixed time has elapsed in the non-operation state in the above-described operation screen or the sleep button is pressed.

(Step S11)

In step S11, the CPU 1 ends the input detection via the input detection unit 3. The process returns to the sleep state of step S1.

In this manner, the sensitivity detection unit 2 can identify the state of the operation body by determining whether the detected input sensitivity information is greater than or equal to the sensitivity threshold value D1 set in the normal sensitivity mode (for example, in the case of the bare hand illustrated in FIG. 6A) or is less than the sensitivity threshold value D1 (for example, in the case of the gloved state illustrated in FIG. 6B), and set an optimum sensitivity mode (more specifically, a sensitivity threshold value) according to each case.

Because the high-sensitivity mode is set in step S3 at a point time at which the unlock screen of step S4 is displayed, the unlock operation is possible with either of the bare finger and the gloved finger as the operation body.

Because it is possible to set optimum sensitivity at an unlock operation time in the unlock screen and maintain the optimum sensitivity from the unlock screen to the next sleep state without direct setting by a user according to the above-described operation, it is possible to eliminate malfunction occurring from the distinction of a gloved/ungloved state of the user, reduce a load on the CPU, and reduce a power consumption amount of a battery.

Figure 3:
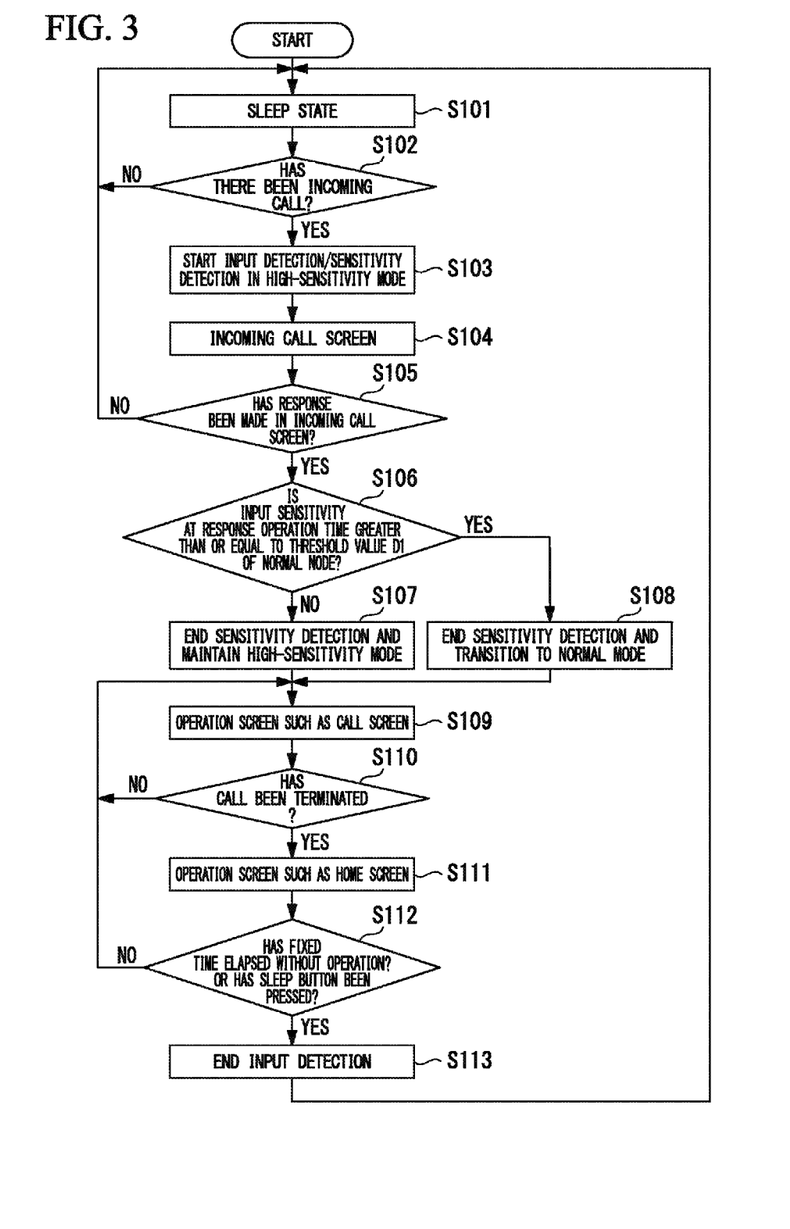
FIG. 3 is a flowchart diagram illustrating an operation when the sensitivity detection screen setting of the information input unit according to the embodiment of the present invention is performed via an "incoming call screen."

FIG. 3 is a flowchart diagram illustrating an operation when the sensitivity detection screen setting of the information input unit according to the embodiment of the present invention is performed via the "incoming call screen."

Hereinafter, an operation when the sensitivity detection screen setting of the information input unit according to this embodiment is performed via the "incoming call screen" will be described using the flowchart illustrated in FIG. 3 with reference to FIG. 1.

Here, it is assumed that the sensitivity threshold value is set as the threshold value D1 (FIG. 7A) in the standard sensitivity mode (normal sensitivity mode) when the user performs an operation with his or her bare hand and the sensitivity threshold value is set as the threshold value D2 (FIG. 7B) in the high-sensitivity mode when the user performs an operation while wearing a glove.

(Step S101)

First, in step S101, this information input unit is put in the sleep state under control of the CPU 1 when a state in which there is no operation continues for a fixed time or the sleep button is pressed.

(Step S102)

Next, in step S102, the CPU 1 waits in the sleep state until there is an incoming call. The process proceeds to step S103 when there is an incoming call.

(Step S103)

In step S103, the CPU 1 receives the incoming call when there is an incoming call, and controls the input detection unit 3 and the sensitivity detection unit 2 to start an operation as an operation under the high-sensitivity mode (in which the sensitivity threshold value is set as the threshold value D2 as illustrated in FIG. 7B).

(Step S104)

Next, in step S104, the CPU 1 controls the display unit 4 to display the incoming call screen (not illustrated).

(Step S105)

Next, in step S105, the CPU 1 verifies whether a response has been made according to the above-described incoming call screen. The process returns to step S101 when no response has been made and proceeds to step S106 if the response has been made.

(Step S106)

In step S106, the sensitivity detection unit 2 determines the state of the operation body such as the finger from the input sensitivity information detected at the response time in the incoming call screen of step S105 using the sensitivity determination means. More specifically, it is verified whether the input sensitivity detected at the response time in the incoming call screen is greater than or equal to the sensitivity threshold value D1 of the normal mode. When the input sensitivity is greater than or equal to the sensitivity threshold value D1 of the normal mode, the process proceeds to step S108. When the input sensitivity is not greater than or equal to the sensitivity threshold value D1 of the normal mode, the process proceeds to step S107.

(Step S107)

In step S107, the sensitivity detection unit 2 maintains the high-sensitivity mode set in step S103 when the detected input sensitivity information is less than the sensitivity threshold value of the normal mode and greater than or equal to the sensitivity threshold value of the high-sensitivity mode (that is, when it is determined that the touch is input by a gloved finger) (accordingly, the threshold value D2 of the high-sensitivity mode continues for the sensitivity threshold value). The process proceeds to step S109 after the sensitivity detection has ended.

(Step S108)

In step S108, the sensitivity detection unit 2 sets the mode to the normal mode when the detected input sensitivity information is greater than or equal to the threshold value D1 of the sensitivity threshold value of the normal mode (that is, when it is determined that a touch has been input by a bare finger) in the determination result of the sensitivity determination means (accordingly, the sensitivity threshold value is also set to the threshold value D1 of the normal sensitivity mode). The process proceeds to step S109 after the sensitivity detection has ended.

(Step S109)

In step S109, the CPU 1 proceeds to an operation screen such as a call screen (the operation screen is displayed) when a response has been made in the incoming call screen. Thereafter, the process proceeds to step S110.

For a subsequent sensitivity threshold value, the threshold value of the sensitivity mode set in step S107 or S108 is maintained.

(Step S110)

In step S110, the CPU 1 waits in the above-described operation screen until an incoming call (and its response) is terminated. The process proceeds to step S111 when the incoming call (and its response) is terminated.

(Step S111)

In step S111, the CPU 1 proceeds to an operation screen such as a standby/home screen when the response has been made in the incoming call screen (various terminal operations are thereby possible). Thereafter, the process proceeds to step S112.

(Step S112)

In step S112, the CPU 1 verifies whether a fixed time has elapsed in the non-operation state or whether the sleep button has been pressed in the above-described operation screen. The process returns to step S109 when the fixed time has not elapsed in the non-operation state or when the sleep button has not been pressed and proceeds to step S113 when the fixed time has elapsed in the non-operation state or when the sleep button has been pressed.

(Step S113)

In step S113, the CPU 1 ends the input detection via the input detection unit 3 (it is assumed that the incoming call detection is also included). The process returns to the sleep state of step S101.

Figure 4:
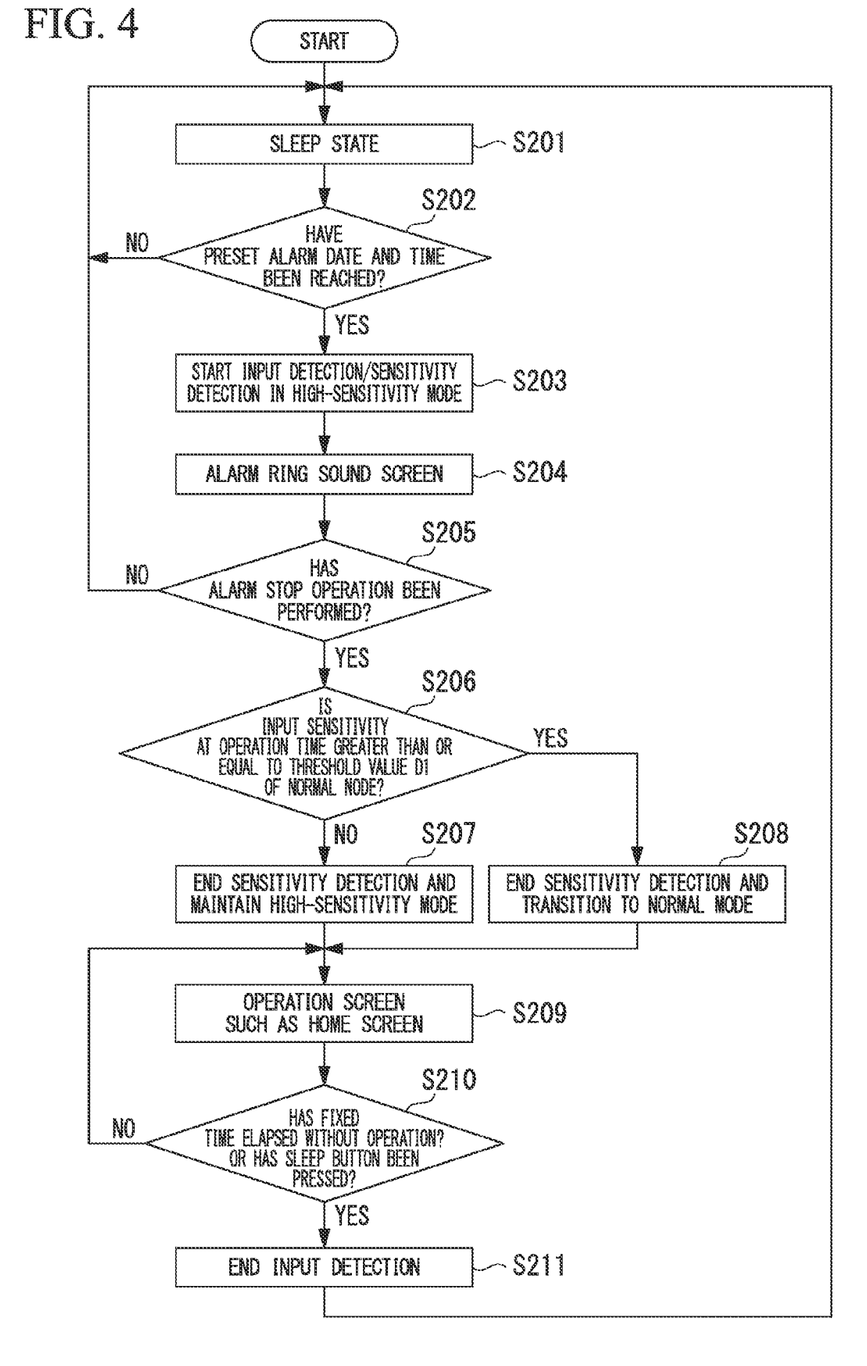
FIG. 4 is a flowchart diagram illustrating an operation when the sensitivity detection screen setting of the information input unit according to the embodiment of the present invention is performed via an "alarm ring sound screen."

FIG. 4 is a flowchart diagram illustrating an operation when the sensitivity detection screen setting of the information input unit according to the embodiment of the present invention is performed via the "alarm ring sound screen."

Hereinafter, an operation when the sensitivity detection screen setting of the information input unit according to this embodiment is performed via the "alarm ring sound screen" will be described using the flowchart illustrated in FIG. 4 with reference to FIG. 1.

Here, it is assumed that the sensitivity threshold value is set as the threshold value D1 (FIG. 7A) in the standard sensitivity mode (normal sensitivity mode) when the user performs an operation with his or her bare hand and the sensitivity threshold value is set as the threshold value D2 (FIG. 7B) in the high-sensitivity mode when the user performs an operation while wearing a glove.

(Step S201)

First, in step S201, this information input unit is put in the sleep state under control of the CPU 1 when a state in which there is no operation continues for a fixed time or when the sleep button is pressed.

(Step S202)

Next, in step S202, the CPU 1 waits in the sleep state until a current time reaches a preset alarm date and time. The process proceeds to step S203 when the current time reaches the preset alarm date and time.

(Step S203)

In step S203, the CPU 1 controls an alarm to ring when the preset alarm date and time are reached, and controls the input detection unit 3 and the sensitivity detection unit 2 to start an operation under the high-sensitivity mode (the sensitivity threshold value is set as the threshold value D2 as illustrated in FIG. 7B).

(Step S204)

Next, in step S204, the CPU 1 controls the display unit 4 to display the alarm ring sound screen (not illustrated).

(Step S205)

Next, in step S205, the CPU 1 verifies whether an operation of stopping the alarm ring sound in the above-described alarm ring sound screen has been performed. The process returns to step S201 when the above-described operation has not been performed, and proceeds to step S206 when the above-described operation is performed.

(Step S206)

In step S206, the sensitivity detection unit 2 determines the state of the operation body such as one's finger from the input sensitivity information detected at the alarm stop operation time of step S205 using the sensitivity determination means. More specifically, it is verified whether the input sensitivity at the alarm stop operation time is greater than or equal to the sensitivity threshold value D1 of the normal mode. When the input sensitivity is greater than or equal to the sensitivity threshold value D1 of the normal mode, the process proceeds to step S208. When the input sensitivity is not greater than or equal to the sensitivity threshold value D1, the process proceeds to step S207.

(Step S207)

In step S207, the sensitivity detection unit 2 maintains the high-sensitivity mode set in step S203 when the detected input sensitivity information is less than the sensitivity threshold value of the normal mode and greater than or equal to the sensitivity threshold value of the high-sensitivity mode (that is, when it is determined that the touch is input by a gloved finger) (accordingly, the threshold value D2 of the high-sensitivity mode continues for the sensitivity threshold value). The process proceeds to step S209 after the sensitivity detection has ended.

(Step S208)

In step S208, the sensitivity detection unit 2 sets the mode to the normal mode when the detected input sensitivity information is greater than or equal to the threshold value D1 of the sensitivity threshold value of the normal mode (that is, when it is determined that a touch has been input by a bare finger) in the determination result of the sensitivity determination means (accordingly, the sensitivity threshold value is also set to the threshold value D1 of the normal sensitivity mode). The process proceeds to step S209 after the sensitivity detection has ended.

(Step S209)

In step S209, the CPU 1 proceeds to an operation screen such as a standby/home screen when the alarm stop operation is performed (the operation screen is displayed and various terminal operations are possible). Thereafter, the process proceeds to step S210.

For a subsequent sensitivity threshold value, the threshold value of the sensitivity mode set in step S207 or S208 is maintained.

(Step S210)

In step S210, the CPU 1 stays in a state of the above-described operation screen until a fixed time has elapsed in the non-operation state in the above-described operation screen or the sleep button is pressed. The process proceeds to step S211 when the fixed time has elapsed in the non-operation state in the above-described operation screen or the sleep button is pressed.

(Step S211)

In step S211, the CPU 1 ends the input detection via the input detection unit 3. The process returns to the sleep state of step S201.

The information input unit of this embodiment can be generally applied to a general portable type information processing terminal device having a program characterized in that the state is the sleep state when a state in which there is no operation continues for a fixed time or when the sleep button is pressed and a specific operation screen is displayed at a sleep state release time.

The above-described "sleep state" may be a "power supply OFF state." In this case, it is assumed that "pressing of the sleep release button" corresponds to a "power supply ON operation" and "pressing of the sleep button" corresponds to a "power supply OFF."

In addition, although the high-sensitivity mode in which there is reaction even when a glove is worn has been described as the high-sensitivity mode, the present invention is not limited to the glove. The case in which the sensitivity threshold value for sensing an input operation by a bare hand of a user having long nails may be set as the high-sensitivity mode.

According to the information input unit related to this embodiment, by setting touch panel sensitivity at an appropriate timing and setting this touch panel sensitivity as effective sensitivity in an appropriate period, there is an advantageous effect in that it is possible to reduce a load on the CPU or reduce a power consumption amount and appropriately cope with state variation in the operation body such as a user's finger used in the input operation.

Second Embodiment

The present invention is characterized in that a detection condition of the input operation is configured by setting a plurality of threshold values at resumption after the sleep state release.

Although either of the two threshold values D1 and D2 is used as the sensitivity threshold value in the above-described first embodiment, values or types (number) of threshold values for providing the sensitivity threshold value in the information input unit according to the present invention are arbitrary. As the second embodiment, a proper threshold value (for example, 50% of a maximum value) can also be obtained from the maximum value of a value of detected input sensitivity and used.

In addition, although a predetermined event defined in advance is an unlock time, an incoming call time, and an alarm ring sound time and the sleep state is released when any one of the events is generated in the first embodiment, the present invention is not limited thereto. In the present invention, in general, it is possible to arbitrarily determine other events which lead to the release of the sleep state.

At least part of a process of each component of the information input unit according to the present invention may be executed by computer control. Further, a program for controlling a computer to execute the above-described process according to a procedure illustrated in the flowcharts of FIGS. 2 to 4 may be stored and distributed in a computer-readable recording medium such as a semiconductor memory, a compact disc-read only memory (CD-ROM), or a magnetic tape. Computers including at least a microcomputer, a personal computer, and a general-purpose computer in the category may read and execute the above-described program from the above-described recording medium.

Priority is claimed on Japanese Patent Application No. 2011-171532, filed Aug. 5, 2011, the content of which is incorporated herein by reference.

INDUSTRIAL APPLICABILITY

An information input unit according to the present invention can utilize features of a portable type information processing terminal device, perform sensitivity detection in an optimum setting, and perform sensitivity adjustment of an input detection unit according to an operation environment of a user.

DESCRIPTION OF REFERENCE SYMBOLS

1 CPU
2 Sensitivity detection unit
3 Input detection unit
4 Display unit

The invention claimed is:

1. An information input unit comprising:
a sensitivity detection unit including an input detection sensor configured to detect contact or proximity of an operation body;
a sensitivity threshold value setting unit configured to set a sensitivity threshold value for determining a magnitude of input sensitivity information detected by the sensitivity detection unit according to a sensitivity mode;
an input determination unit configured to compare input sensitivity information detected by the sensitivity detection unit to the set sensitivity threshold value and determine that an input operation has been performed when the input sensitivity information exceeds the sensitivity threshold value;
a high-sensitivity mode setting unit configured to set the sensitivity threshold value to a threshold value corresponding to a high sensitivity mode via the sensitivity threshold value setting unit when one of predetermined events which lead to release of a sleep state is generated;
a display unit configured to display a predetermined display screen corresponding to the predetermined event after the threshold value has been set; and
a sensitivity threshold value resetting unit configured to change the sensitivity mode according to the input sensitivity information when an input operation is performed and reset the sensitivity threshold value via the sensitivity threshold value setting unit when the input operation has been performed in the high-sensitivity mode for the predetermined display screen displayed in correspondence with generation of the one predetermined event caused by an operation of stopping an alarm ring indicated as an alarm ring sound screen displayed on the display unit.

2. The information input unit according to claim 1, wherein, when input sensitivity information from the sensitivity detection unit does not exceed a threshold value corresponding to a normal mode which is greater than the sensitivity threshold value corresponding to the high-sensitivity mode when the input operation in the high-sensitivity mode has been performed, the threshold value corresponding to the high-sensitivity mode is set as the sensitivity threshold value, and wherein, when the input sensitivity information exceeds the threshold value corresponding to the normal mode, the threshold value corresponding to the normal mode is set as the sensitivity threshold value.

3. The information input unit according to claim 1, wherein the predetermined event which leads to the release of the sleep state is pressing of a sleep release button, an incoming call, or the predetermined display screen displayed in correspondence with the generation of the event is set as an unlock screen, or an incoming call screen.

4. The information input unit according to claim 1, wherein the input detection sensor is an electrostatic capacitance type sensor.

5. An information input method comprising:
a sensitivity detection step of using information from an input detection sensor which detects contact or proximity of an operation body;
a sensitivity threshold value setting step of setting a sensitivity threshold value for determining a magnitude of input sensitivity information detected in the sensitivity detection step according to a sensitivity mode;
an input determination step of comparing the input sensitivity information detected in the sensitivity detection step to the set sensitivity threshold value and determining that an input operation has been performed when the input sensitivity information exceeds the sensitivity threshold value;
a high sensitivity mode setting step of setting the sensitivity threshold value to the threshold value corresponding to the high-sensitivity mode via the sensitivity threshold value setting step when one of predetermined events which leads to release of a sleep state is generated;
a display step of displaying a predetermined display screen corresponding to the event after the setting; and
a sensitivity threshold value resetting step of changing the sensitivity mode according to the input sensitivity information at an operation time and resetting the sensitivity threshold value via the sensitivity threshold value setting step when the input operation has been performed in the high-sensitivity mode for the predetermined display screen displayed in correspondence with generation of the one predetermined event caused by an operation of stopping an alarm ring indicated as an alarm ring sound screen displayed during the display step.

6. The information input method according to claim 5, wherein, when input sensitivity information from the sensitivity detection step does not exceed a threshold value corresponding to a normal mode which is greater than the sensitivity threshold value corresponding to the high-sensitivity mode when the input operation in the high-sensitivity mode has been performed, the threshold value corresponding to the high-sensitivity mode is set as the sensitivity threshold value, and wherein, when the input sensitivity information exceeds the threshold value corresponding to the normal mode, the threshold value corresponding to the normal mode is set as the sensitivity threshold value.

7. The information input method according to claim 5, wherein the predetermined event which leads to the release of the sleep state is pressing of a sleep release button, an incoming call, or the predetermined display screen displayed in correspondence with the generation of the event is set as an unlock screen, or an incoming call screen.

8. A non-transitory computer-readable storage medium storing a computer program for controlling a computer to perform a method of an information input method, the method comprising:
a sensitivity detection step of using information from an input detection sensor which detects contact or proximity of an operation body;
a sensitivity threshold value setting step of setting a sensitivity threshold value for determining a magnitude of input sensitivity information detected in the sensitivity detection step according to a sensitivity mode;
an input determination step of comparing the input sensitivity information detected in the sensitivity detection step to the set sensitivity threshold value and determining that an input operation has been performed when the input sensitivity information exceeds the sensitivity threshold value;
a high sensitivity mode setting step of setting the sensitivity threshold value to the threshold value corresponding to the high-sensitivity mode via the sensitivity threshold value setting step when one of predetermined events which leads to release of a sleep state is generated;
a display step of displaying a predetermined display screen corresponding to the event after the setting; and
a sensitivity threshold value resetting step of changing the sensitivity mode according to the input sensitivity information at an operation time and resetting the sensitivity threshold value via the sensitivity threshold value setting step when the input operation has been performed in the high-sensitivity mode for the predetermined display screen displayed in correspondence with generation of the one predetermined event caused by an operation of stopping an alarm ring indicated as an alarm ring sound screen displayed during the display step.

9. The non-transitory computer-readable storage medium according to claim 8,
wherein, when input sensitivity information from the sensitivity detection step does not exceed a threshold value corresponding to a normal mode which is greater than the sensitivity threshold value corresponding to the high-sensitivity mode when the input operation in the high-sensitivity mode has been performed, the threshold value corresponding to the high-sensitivity mode is set as the sensitivity threshold value, and wherein, when the input sensitivity information exceeds the threshold value corresponding to the normal mode, the threshold value corresponding to the normal mode is set as the sensitivity threshold value.

10. The non-transitory computer-readable storage medium according to claim 8, wherein the predetermined event which leads to the release of the sleep state is pressing of a sleep release button, an incoming call, or the predetermined display screen displayed in correspondence with the generation of the event is set as an unlock screen, or an incoming call screen.

* * * * *